UNITED STATES PATENT OFFICE.

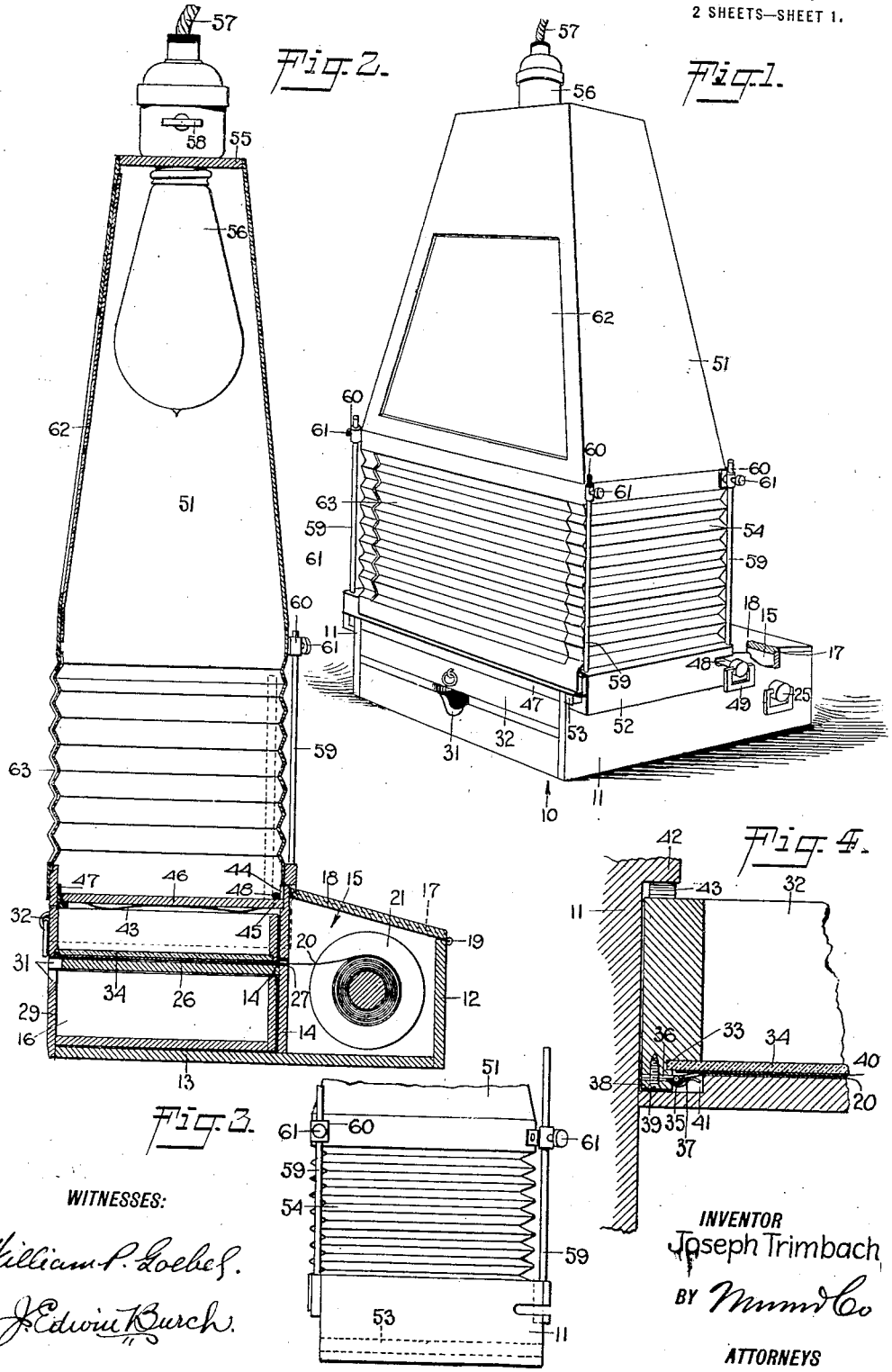

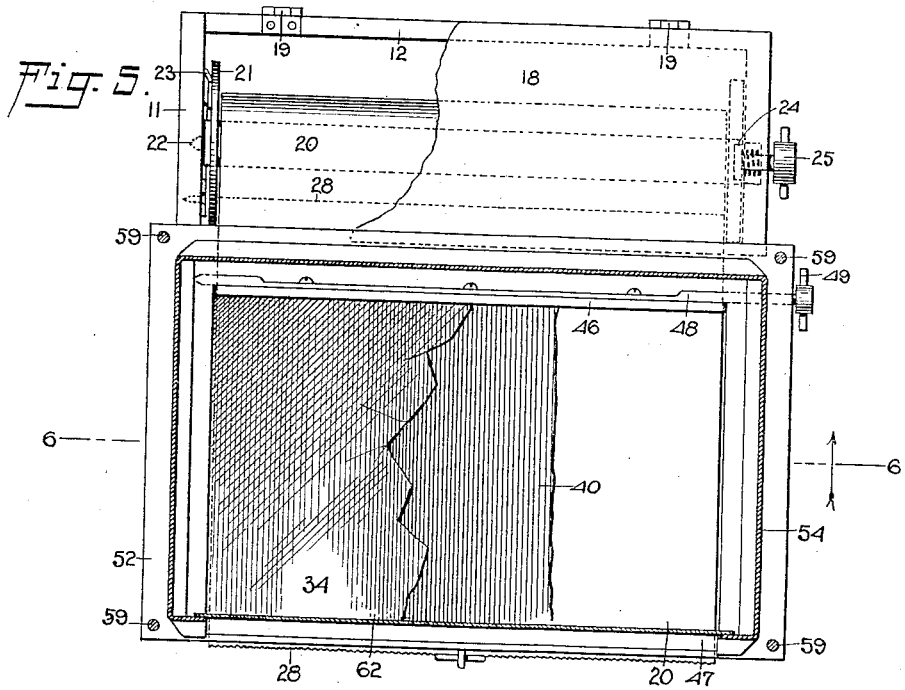
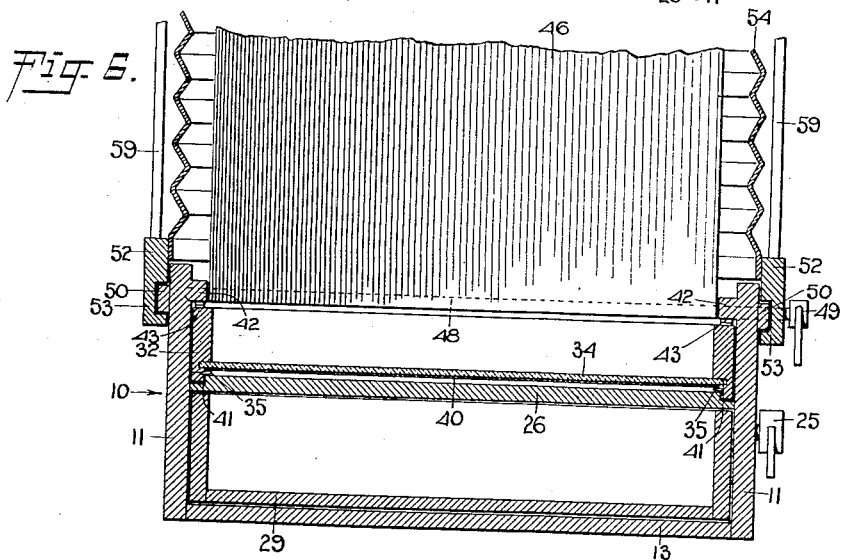
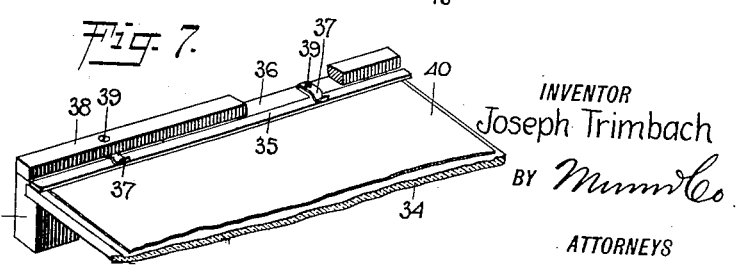

JOSEPH TRIMBACH, OF RYE, NEW YORK.

PRINTING-CAMERA.

1,159,296.　　　Specification of Letters Patent.　　Patented Nov. 2, 1915.

Application filed January 9, 1915. Serial No. 1,369.

*To all whom it may concern:*

Be it known that I, JOSEPH TRIMBACH, a citizen of the United States, and a resident of Rye, in the county of Westchester and State of New York, have invented a new and Improved Printing-Camera, of which the following is a full, clear, and exact description.

This invention has reference to the class of photography and relates more particularly to an improved printing camera or photo printing cabinet or machine.

The main object of the invention is comprehended in the provision of a photo printing device which will permit the printing of pictures or photographs from flexible films or photographic plates by artificial light and in such a manner that a strip of printing paper wound upon a roll or otherwise may be used and brought to printing position without many of the operations and manipulations now necessary in printing with an ordinary printing device.

A further object of the invention is to provide a printing camera, apparatus or device by which a single source of light will serve not only for printing the picture from the negative or film but will also serve to supply light absent of actinic or chemically active rays so that in a dark room the manipulation of the pictures and films, as well as the operation of the device, can be readily carried on without any possibility of injuring the sensitized printing paper or pictures by the action of actinic rays, the device being so constructed as to obviate the use of short lengths of printing paper for each printing operation, to protect the printing paper from the source of light after an exposure is made so that the necessity of continually igniting and extinguishing a lamp or source of light will be obviated, in addition to providing means for adjusting the source of light toward and away from the negative and printing paper so as to vary the distance therebetween and consequently the intensity of the light rays so that the length of time for effectively printing a picture can be regulated according to the clearness of the negative or film, thickness of the printing paper and other controlling conditions.

With the above and other objects in view, the invention resides more particularly in the peculiar combination and arrangement of parts to be hereinafter more fully described, illustrated and claimed, it being also an object to provide a device which is simple in construction, durable and efficient in operation and not likely to get out of order.

Reference is to be had to the accompanying drawings forming a part of this specification, in which similar characters of reference indicate corresponding parts in all the views and in which,—

Figure 1 is a perspective view of a printing camera or photo printing device constructed in accordance with my invention; Fig. 2 is a central vertical sectional view thereof; Fig. 3 is a fragmentary side elevation showing the hood or light chamber partly collapsed as distinguished from the extended positions thereof shown in Figs. 1 and 2; Fig. 4 is an enlarged detail vertical sectional view through the cabinet proper of the machine to show the manner of holding a film or negative in position for printing therefrom; Fig. 5 is a horizontal sectional view of the device taken through the expansible light chamber and looking downwardly, certain portions of the device being broken away to more clearly disclose the interior structure; Fig. 6 is a fragmentary vertical sectional view taken on the line 6—6 of Fig. 5, with the parts broken away in said figure supplied; Fig. 7 is a detail sectional inverted perspective view of the frame for holding the negative or film within the cabinet proper for printing therefrom.

As shown in the drawings, the improved printing camera or photo printing device includes a cabinet or box 10, preferably of rectangular form in plan and relatively low or flat. The cabinet includes side walls 11 and a rear wall 12 closed by a bottom wall 13, while the front portion of the cabinet is open. Arranged transversely of the cabinet is a vertical partition or dividing wall 14 which divides the cabinet into a rear compartment 15 and a forward compartment 16, the side walls 11 of the cabinet adjacent to the compartment 15 being preferably beveled rearwardly to coöperate with the rabbeted edges 17 of a closure 18 which is hinged to the rear wall 12, as shown at 19, and designed to swing toward and away from the partition 14 in covering and uncovering the compartment 15. This closure, as well as the remaining parts of the device, are made to fit in such a manner as to exclude exterior light rays which would be likely to injure the printing paper 20 which is wound upon a spool or drum 21 journaled in the compartment 15 through the medium of the side walls 11. One end of the spool or drum is removably journaled in one side wall, as shown at 22, and the adjacent flanged end thereof is designed for contact with a friction or brake spring 23 which prevents the spool from freely turning and thus prevents the paper from unwinding therefrom except when positively drawn or pulled out. The other end of the spool or drum is provided with the usual notch 24, the same as spools employed for carrying flexible roll films, and is designed to be removably engaged by the bit of a spring actuated key 25 which is supportable from the exterior of the cabinet in order to turn the spool in either direction for winding or unwinding the printing paper, access being had to the compartment when the cover or closure 18 is open in order to renew the printing paper or if already wound upon a new spool, to replace the old one.

The cabinet is further provided with a horizontal partition 26 which divides the compartment 16 vertically, and the vertical partition 14 immediately above the partition 26 is provided with a horizontal slot 27 through which the printing paper 20 is passed to rest upon the partition 26 and thereby be supported in a longitudinal position while the free end thereof is designed to be projected from the front of the cabinet in order to permit the same to be drawn for bringing unused portions to exposed position and tearing off portions which have been printed on. In order to facilitate the tearing of the strip of printing paper, the same is scored or perforated at regular intervals, as shown at 28 in Fig. 5 of the drawings, but it is to be understood that the width of the strip and the lengths of the sections thereof may vary, depending upon the size of the picture to be printed.

The lower portion of the compartment 16 is designed to take a sliding drawer 29 for containing various accessories, films and the like, in convenient position to be used, and in order to permit the drawer to be opened the upper edge of its front portion and the adjacent edge of the partition 26 are provided with finger notches or seats 31 into which one finger is inserted for extricating the drawer. The portion of the compartment 16 above the partition 26 is designed to take a negative or film holding frame 32 with the print paper 20 passing therebeneath and this frame is provided at its sides and back portion near the bottom edges thereof with grooves or guideways 33 in which a transparent panel 34, such as glass, is removably fitted. At the sides of the frame clamping members are provided, the same being in the form of strips 35, preferably of metal, pivoted to anchoring strips 36 and normally pressed toward the bottom face of the transparent panel by spring means consisting of spring fingers 37 which, like the plates 36, are anchored or secured in position by cleats 38 secured to the bottom edges of the sides of the frame 32 by suitable fasteners, as, for instance, screws 39.

The negative, which is indicated by the numeral 40, is designed to be held against the bottom face of the panel, the clamping members being raised to permit the insertion of the corresponding edges of the film or negative with the gelatin side so positioned as to produce a positive print. When clamped in this manner the negative or film will also be held taut or rectilinear, this being assisted owing to the fact that the partition 26 adjacent to the side walls 11 is rabbeted to provide grooves 41 which are engaged by the sides of the frame in such a manner as to bring the negative or film beneath the transparent panel in contact with the print paper on top of the partition 26.

In order to hold the frame from upward displacement, as well as to exclude light from the top of the cabinet, the side walls 11 at their upper edges are provided with overhanging parts 42, to the bottom walls of which leaf springs 43 are secured in such a manner as to be interposed with respect to said overhanging parts and the top edges of the side portions of the frame or holder 32 so as to further hold the latter downward. The forward face of the partition 14 adjacent to the upper edge thereof is rabbeted as shown at 44, and pivoted to said partition so that its rear edge will seat in said rabbet, as shown at 45, in order to exclude light at this point is a shutter 46 which fits inside of the cabinet, that is, between the side walls thereof, and which rests at its free edge upon an angular or a rabbeted cross piece 47 between the side walls at the top portion of the cabinet at the front thereof. The pivot of the shutter 46 is indicated by the numeral 48 and is provided with an operating key 49 exteriorly of the cabinet at one side, preferably at the same side where the key 25 is disposed, so as to permit the print paper carrying spool and the shutter to be conveniently manipulated.

At the sides of the cabinet near the edge thereof, horizontal ribs 50 are provided, the same being designed to removably support an extensible light chamber 51 which is provided with a frame 52 at its lower open end. The side portions of this frame are provided with grooves 53 extending throughout the length thereof for engaging the ribs 50 in order to removably attach the light chamber or hood thereto to permit the same to be conveniently displaced horizontally with respect to the cabinet. The light chamber or hood is of a cross section corresponding to the cross section of the opening in the cabinet at which the shutter is mounted, and in the present instance is shown of rectangular cross section and in the form of a truncated pyramid with its base prolonged by means of an extensible or bellows-like lower portion 54 which is connected with the base of the truncated pyramidal part of the light chamber and with the frame 52. In the top portion of the light chamber a source of light or electric lamp 56 is mounted, the wiring 57 of which is designed to carry an ordinary attachment plug for attachment to the threaded socket of a light fixture or otherwise, in order to supply the necessary current, while the operation of the lamp is capable of control in the usual manner by a key 58 exteriorly of the light chamber.

The inner surfaces of the walls of the light chamber are made to give the proper light projection for the best operation of the device, and in conjunction therewith electric light bulbs of different candle power can be employed to regulate the intensity of the light. The extensibility of the light chamber further provides for the accomplishment of the latter object, which is effected through the medium of the extensible part 54, and for this purpose the upper or rigid part of the light chamber is adjustably supported by the frame 52 so as to permit the part 54 to be extended or collapsed to vary the distance between the source of light and the negative and paper to be printed upon. By way of illustration a plurality of rods 59 is vertically mounted at the corners of the extensible part of the light chamber, being supported at their lower ends by the frame 52 and being engageable through sleeves 60 at the corners of the rigid or truncated portion of the light chamber. In this manner the last named portion of the light chamber may be adjusted vertically with respect to the frame, the sleeves 60 riding up and down on the rods 59 and being capable of being held in any desired adjusted position through the medium of binding members such as set screws 61 threaded through the sleeves and disposed to frictionally engage the rods. The front of the light chamber is provided with an orange or red colored panel 62, and the extensible part 54 with a bellows-like panel 63, these panels being designed to permit sufficient light to pass therethrough to allow the operator to easily manipulate the device or ascertain the condition of the film or picture but to prevent the penetration or escape of actinic light rays from the source of light within the light chamber so that the sensitized paper will not be injured until fixed.

In the operation of the device as described, a photographic plate or film is held or clamped in position beneath the glass panel of the frame and with the shutter 46 closed the print paper is drawn out to the front edge of the cabinet beneath the frame 32 and to slightly project therefrom. The frame is then placed in position while the print paper is held from displacement rearwardly, as by grasping the free end thereof. When this is done the shutter 46 is swung open to the dotted line position shown in Fig. 2 of the drawings by means of the key 49, to allow the actinic rays to print the paper. The time of exposure and the intensity of the light may be regulated or gaged in the manner heretofore described, and if slow paper is used the movement of the shutter on a pivot will be immaterial so far as the difference in the time of exposure of the front and rear portions of the picture is concerned, and if quick printing paper is employed the source of light may be extinguished while the shutter 46 is still open and the shutter then closed, after which the light can be ignited. Importance attaches to the present device, however, by reason of the dual purpose served by the printing light in supplying non-actinic light rays for working and actinic rays for printing, so that the necessity of handling the various parts incident to printing at the present time, and constantly turning off and on white and red lights, is obviated. All of the parts excepting where described as provided for the best reflection of the light rays, and particularly exteriorly of the cabinet and light chamber, will be covered with some dark material or darkened as is common in the art.

Having thus described my invention, what I claim as new and desire to secure by Letters Patent is:—

1. A printing camera embodying a cabinet designed to support photo printing material in position to be exposed, means to support a picture negative thereover, an extensible light chamber positioned upon the cabinet, a source of light therein designed to be thrown upon the negative and material to be printed therefrom, said light chamber being movable with respect to said cabinet, and means for holding said light chamber in adjusted position, extended or collapsed.

2. A printing camera embodying a cabinet designed to support photo printing material in position to be exposed, means to support a picture negative thereover, an extensible light chamber positioned upon the cabinet, a source of light therein designed to be thrown upon the negative and material to be printed therefrom, said light chamber being removably supported and having colored panels through which non-actinic rays pass and means for holding said light chamber in a predetermined position when extended or collapsed.

3. A photo printing device, comprising a cabinet-forming box, a support in the box for a strip of printing paper or the like, means to support said paper in position to be exposed for printing thereon, a frame removably fitted in the box, clamping means at the bottom of the frame for securing a film in position to be exposed over the printing paper, a shutter movably supported above the frame to admit or exclude chemically active light rays with respect to the film and paper, said shutter being operable exteriorly of the box and a hood supported upon the box over the shutter and carrying a source of light, said hood enlarging from the source of light and having a colored panel permitting the passage of non-actinic rays exteriorly thereof and an extensible part adjustable to vary the distance between the source of light and the picture to be printed.

4. A photographic printing device, comprising a cabinet having an open front portion and a vertical partition dividing the same into compartments, an exteriorly operated spool journaled in one compartment for holding a strip of printing paper, said partition having a horizontal slot through which said strip is designed to pass, a horizontal partition in the other compartment over which said paper is disposed for printing thereon, a drawer fitted in one compartment beneath said horizontal partition, a closure for the first compartment having light excluding formation, a frame removably engageable above said horizontal partition, spring clamps at the bottom of the frame, a transparent panel held at the bottom of the frame against which a flexible film may be held by the clamps above the print paper, said cabinet having parts overlying the frame, spring means between said overlying parts and the frame, an extensible light chamber removably supported upon the cabinet, an exteriorly operated pivoted shutter in the top of the cabinet over the frame and a source of light in the top of the light chamber the rays of which are permitted to print a picture upon the paper when the shutter is open within the light chamber or cut off therefrom when the shutter is closed, said light source being controllable exteriorly of the chamber and the light chamber having means whereby non-actinic rays will pass therethrough for working exteriorly thereof as and for the purpose set forth.

In testimony whereof I have signed my name to this specification in the presence of two subscribing witnesses.

JOSEPH TRIMBACH.

Witnesses:
 EDNA M. DRUMEN,
 E. BUEL.